June 16, 1959 W. C. SEIFERT 2,890,575
POWER-TRANSMITTING DEVICE
Filed April 9, 1956
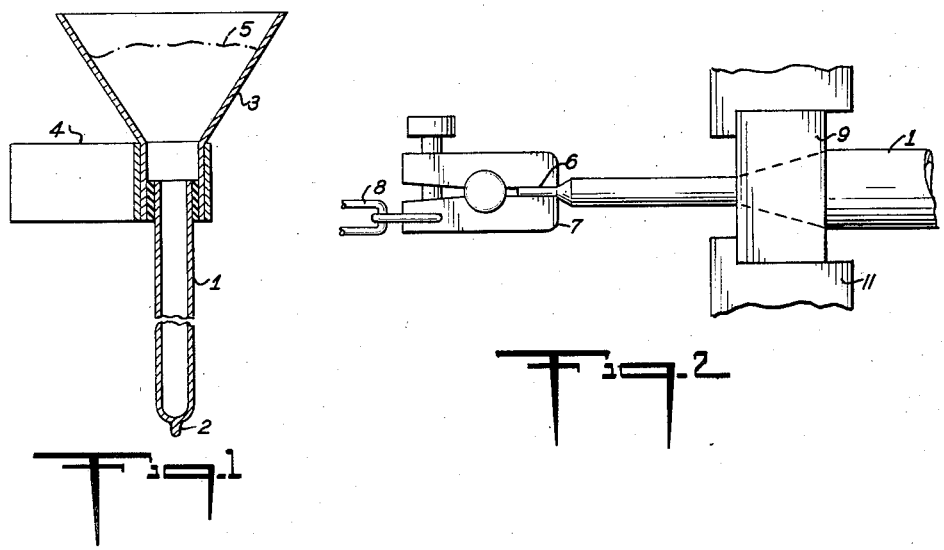
Fig. 1    Fig. 2
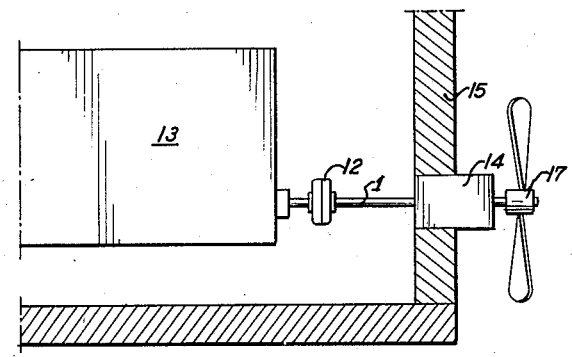
Fig. 3
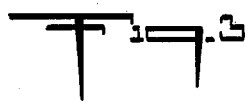
Fig. 4
INVENTOR
WILLIAM C. SEIFERT
BY Louis Burgess
ATTORNEY United States Patent Office 2,890,575
Patented June 16, 1959

2,890,575
POWER-TRANSMITTING DEVICE

William C. Seifert, Narbeth, Pa., assignor to Donald W. Kent, Philadelphia, Pa.

Application April 9, 1956, Serial No. 577,127

2 Claims. (Cl. 64—1)

This invention is a new and useful shaft for the transmission of stress. The invention will be fully understood from the following description read in conjunction with the drawing, in which:

Fig. 1 is a diagrammatic showing of one step in the manufacture of the shaft of my invention;

Fig. 2 is a diagrammatic showing of a second step in the manufacture of the shaft of my invention;

Fig. 3 is a diagrammatic showing of such a shaft in service for the transmission of power from one point to another; and Fig. 4 is a vertical section of a portion of the shaft shown in Fig. 3.

Referring to Fig. 1, the tube 1 is made of high-tensile strength metal, such as is normally used for drive shafting, torque rods, struts, etc.

The lower end of tube 1 is sealed by squeezed portion 2, and the upper end is connected to hopper 3, provided with vibrator 4 and containing finely divided high-melting-point inorganic oxide, such as alumina, zirconia, magnesia or other high temperature refractory. By operating vibrator 4, tube 1 is completely filled with oxide. For certain critical uses this operation may be performed under vacuum. The other end of tube 1 is then sealed by squeezed portion 6 and engaged by gripper jaws 7, upon which traction is exerted by chain 8 to draw the tube through swaging die 9, secured in holder 11. The drawing reduces the external diameter without substantially affecting the wall thickness, thereby reducing the enclosed volume and compressing the contained oxide. The reduction is carried to the point at which the oxide. The reduction is carried to the point at which the voids are substantially eliminated. This results in a shaft with exceptionally high torque transmission characteristics in proportion to weight and with high resistance to vibration and fluttering. For special purposes the tube 1 may be composed of a heat-treatable alloy and heat-treated after it has been drawn. For special purposes the tube may be drawn with other than round and/or eccentric cross-section.

By reference to Fig. 3 in which I have illustrated one application of my invention, the shaft so fabricated receives power through universal joint 12 from internal combustion engine 13, and transmits this power to stuffing box 14, mounted in sternpost 15 of hull 16 to propeller 17, by which the hull is driven.

As shown in Fig. 4, the tubular casing 1 forming the outer shell or casing of the shaft shown in Fig. 3 surrounds the core 5 of high melting point inorganic oxide.

The shaft of my invention is generally applicable as an engine mount, torque rod, power-transmitting shaft, and generally for carrying loads either in torque, tension or compression.

The structure is also adapted to use as tubular sections in cases where high stress or flexing type loads are encountered, such as the individual members of an air frame. In cases where light weight is essential the outer sheath may be formed of aluminum or magnesium or light weight alloys. One particular advantage of the structure of my invention is that it retains its strength at relatively high temperatures.

I claim:

1. A shaft for the transmission of stress, consisting of an external tubular sheath of high-tensile-strength metal surrounding a core of high-melting point inorganic oxide, and reduced in diameter upon said core by longitudinal drawing to compress said core to maximum density.

2. Method for transmitting torque from a driving member to a driven member, which comprises imparting a rotary movement to an external tubular sheath of high-tensile-strength metal surrounding a core of high-melting point inorganic oxide and reduced in diameter upon said core by longitudinal drawing to compress said core to maximum density, by connecting the same to said driving member, and transmitting said movement to said driven member by connecting the same to another portion of said tubular sheath.

References Cited in the file of this patent

UNITED STATES PATENTS

| | | |
|---|---|---|
| 1,371,875 | Douros | Mar. 15, 1921 |
| 2,001,166 | Swennes | May 14, 1935 |
| 2,591,442 | Hulbert et al. | Apr. 1, 1952 |
| 2,599,575 | Morgan | June 10, 1952 |

UNITED STATES PATENT OFFICE

CERTIFICATE OF CORRECTION

June 16, 1959

Patent No. 2,890,575

William C. Seifert

It is hereby certified that error appears in the printed specification of the above numbered patent requiring correction and that the said Letters Patent should read as corrected below.

Column 1, line 46, after "oxide" strike out ". The reduction is carried to the point" and insert -- has reached maximum density, i.e., --.

Signed and sealed this 27th day of October 1959.

(SEAL)
Attest:
KARL H. AXLINE
Attesting Officer

ROBERT C. WATSON
Commissioner of Patents